United States Patent
Hidayat et al.

(10) Patent No.: US 9,405,910 B2
(45) Date of Patent: Aug. 2, 2016

(54) AUTOMATIC LIBRARY DETECTION

(71) Applicant: Shape Security, Inc., Palo Alto, CA (US)

(72) Inventors: Ariya Hidayat, Mountain View, CA (US); Bei Zhang, Mountain View, CA (US)

(73) Assignee: Shape Security, Inc., Palo Alto, CA (US)

( * ) Notice: Subject to any disclaimer, the term of this patent is extended or adjusted under 35 U.S.C. 154(b) by 16 days.

(21) Appl. No.: 14/293,895

(22) Filed: Jun. 2, 2014

(65) Prior Publication Data

US 2015/0347756 A1    Dec. 3, 2015

(51) Int. Cl.
*G06F 21/57*    (2013.01)

(52) U.S. Cl.
CPC ....................... *G06F 21/57* (2013.01)

(58) Field of Classification Search
CPC ....................................................... G06F 21/57
See application file for complete search history.

(56) References Cited

U.S. PATENT DOCUMENTS

| | | | |
|---|---|---|---|
| 6,938,170 B1 | 8/2005 | Kraft et al. | |
| 7,058,699 B1 * | 6/2006 | Chiou | G06F 8/51 709/219 |
| 7,117,429 B2 | 10/2006 | Vedullapalli et al. | |
| 7,398,553 B1 * | 7/2008 | Li | G06F 21/566 713/189 |
| 7,464,326 B2 | 12/2008 | Kawai et al. | |
| 7,480,385 B2 | 1/2009 | Weber | |
| 7,636,945 B2 * | 12/2009 | Chandnani | G06F 21/563 713/188 |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 8,020,193 B2 | 9/2011 | Bhola et al. | |
| 8,086,756 B2 | 12/2011 | Kamyshenko et al. | |
| 8,086,957 B2 | 12/2011 | Bauchot et al. | |
| 8,170,020 B2 | 5/2012 | Oliver et al. | |
| 8,200,958 B2 | 6/2012 | Coppola et al. | |
| 8,266,202 B1 | 9/2012 | Colton et al. | |
| 8,453,126 B1 * | 5/2013 | Ganelin | G06F 8/42 717/136 |
| 8,533,480 B2 | 9/2013 | Pravetz et al. | |
| 8,555,388 B1 | 10/2013 | Wang et al. | |
| 8,561,193 B1 | 10/2013 | Srivastava et al. | |
| 8,589,405 B1 * | 11/2013 | Estan | G06F 17/30542 707/745 |
| 8,621,197 B2 | 12/2013 | Suryanarayana et al. | |

(Continued)

FOREIGN PATENT DOCUMENTS

| | | |
|---|---|---|
| CN | 101471818 | 5/2011 |
| GB | 2443093 A | 4/2008 |

(Continued)

OTHER PUBLICATIONS

Aho, A., et al. (Jun. 1975) "Efficient String Matching: An Aid to Bibliographic Search" In Communications of the ACM, vol. 18, issue 6, pp. 333-340.

(Continued)

*Primary Examiner* — David Le
*Assistant Examiner* — Darshan Dhruv
(74) *Attorney, Agent, or Firm* — Fish & Richardson P.C.

(57) ABSTRACT

The automated, real-time detection of specific blocks of code within a larger body of source code is described. Specific implementations relate to the detection of known code libraries in web page code to improve the efficiency of the generation of polymorphic transformations of the web page code for the purpose of impeding automated cyber-attacks.

21 Claims, 6 Drawing Sheets

(56) References Cited

U.S. PATENT DOCUMENTS

| | | | |
|---|---|---|---|
| 8,677,481 B1* | 3/2014 | Lee | H04L 63/168 726/22 |
| 8,689,330 B2 | 4/2014 | Sinn et al. | |
| 8,762,962 B2* | 6/2014 | Ben-Artzi | G06F 8/51 714/52 |
| 8,914,879 B2* | 12/2014 | Melnik et al. | H04L 63/0227 726/22 |
| 2002/0099827 A1 | 7/2002 | Shah et al. | |
| 2002/0199116 A1 | 12/2002 | Hoene et al. | |
| 2004/0088651 A1* | 5/2004 | McKnight | G06F 8/427 715/234 |
| 2004/0162994 A1 | 8/2004 | Cohen et al. | |
| 2005/0216770 A1 | 9/2005 | Rowett et al. | |
| 2005/0240999 A1* | 10/2005 | Rubin | G06F 21/563 726/22 |
| 2005/0251536 A1* | 11/2005 | Harik | G06F 17/277 |
| 2006/0053295 A1 | 3/2006 | Madhusudan et al. | |
| 2006/0288418 A1 | 12/2006 | Yang et al. | |
| 2007/0011295 A1 | 1/2007 | Hansen | |
| 2007/0064617 A1 | 3/2007 | Reves | |
| 2007/0074227 A1 | 3/2007 | Naidu et al. | |
| 2008/0222736 A1 | 9/2008 | Boodaei et al. | |
| 2009/0070459 A1* | 3/2009 | Cho | H04L 63/145 709/224 |
| 2009/0099988 A1 | 4/2009 | Stokes et al. | |
| 2009/0144829 A1 | 6/2009 | Grigsby et al. | |
| 2009/0193513 A1 | 7/2009 | Agarwal et al. | |
| 2009/0241174 A1 | 9/2009 | Rajan et al. | |
| 2009/0249310 A1 | 10/2009 | Meijer et al. | |
| 2009/0282062 A1 | 11/2009 | Husic | |
| 2009/0292984 A1 | 11/2009 | Bauchot et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan et al. | |
| 2010/0287132 A1 | 11/2010 | Hauser | |
| 2011/0015917 A1 | 1/2011 | Wang et al. | |
| 2011/0022846 A1 | 1/2011 | Ginter et al. | |
| 2011/0047169 A1 | 2/2011 | Leighton et al. | |
| 2011/0154308 A1* | 6/2011 | Lobo | G06F 8/4435 717/153 |
| 2011/0178973 A1 | 7/2011 | Lopez et al. | |
| 2011/0185427 A1* | 7/2011 | Aciicmez | G06F 21/53 726/24 |
| 2011/0296391 A1 | 12/2011 | Gass et al. | |
| 2011/0320816 A1 | 12/2011 | Yao et al. | |
| 2012/0022942 A1 | 1/2012 | Holloway et al. | |
| 2012/0096116 A1 | 4/2012 | Mislove et al. | |
| 2012/0124372 A1 | 5/2012 | Dilley et al. | |
| 2012/0198528 A1 | 8/2012 | Baumhof | |
| 2012/0216251 A1 | 8/2012 | Kumar et al. | |
| 2013/0091582 A1 | 4/2013 | Chen et al. | |
| 2013/0198607 A1 | 8/2013 | Mischook et al. | |
| 2013/0219256 A1 | 8/2013 | Lloyd et al. | |
| 2013/0227397 A1 | 8/2013 | Tvorun et al. | |
| 2013/0232234 A1 | 9/2013 | Kapur et al. | |
| 2013/0263264 A1 | 10/2013 | Klein et al. | |
| 2013/0340043 A1 | 12/2013 | Zarei et al. | |
| 2014/0040787 A1 | 2/2014 | Mills et al. | |
| 2014/0089786 A1 | 3/2014 | Hashmi | |
| 2014/0281535 A1 | 9/2014 | Kane et al. | |
| 2015/0058992 A1* | 2/2015 | El-Moussa | H04L 63/145 726/24 |
| 2015/0304337 A1* | 10/2015 | Nguyen-Tuong | G06F 21/51 726/1 |

FOREIGN PATENT DOCUMENTS

| | | |
|---|---|---|
| WO | WO00/72119 | 11/2000 |
| WO | WO02/093369 | 11/2002 |
| WO | WO2008/095018 | 8/2008 |
| WO | WO2008/095031 | 8/2008 |
| WO | WO2008/130946 | 10/2008 |
| WO | WO2010/046314 | 4/2010 |
| WO | WO2013091709 | 6/2013 |

OTHER PUBLICATIONS

U.S. Appl. No. 14/055,704, filed Oct. 16, 2013, Call et al.

Cova et al., "Detection and Analysis of Drive-by-Download Attacks and Malicious JavaScript Code," World Wide Web Conference Committee, Apr. 26-30, 2010. Retrieved from the Internet <URL: http://www.cs.ucsb.edu/~vigna/publications /2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclagb.tuwien.ac.at/papers/driveby.pdf>, 19 pages, 2009.

Hofmeyr et al., Intrusion Detection using Sequence of System calls, Journal of Computer Security 6 (1998).

Li et al., "WebShield: Enabling various web defense techniques without client side modifications," In Proceedings of the 18th Annual Network and Distributed System Security Symposium (NDSS), 2011, 18 pages.

Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.

Oh, "Recent Java exploitation trends and malware," Black Hat USA 2012, Retrieved from the Internet; <URL: https://media.blackhat.com/bh-us12/Briefings/Oh/GBH_US_12_Oh_Recent_Java_Exploitation_Trends-and_Malware_WP.pdf>, 27 pages.

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

Sedaghat et al.; "On-the-fly web content integrity check boosts users' confidence"; Nov. 2002; Communications of the ACM, vol. 45 Issue 11; Publisher: ACM; pp. 33-37.

* cited by examiner

AUTOMATIC LIBRARY DETECTION

BACKGROUND

Automated cyber-attacks that exploit web applications have been on the rise throughout the past decade, growing in both frequency and variety. Many of these cyber-attacks have potentially devastating consequences. For instance, a recent automated attack modified banking transactions without using authentication credentials. Thus, defending against automated attacks is becoming an increasingly high priority for businesses with an online presence.

Implementing security countermeasures to prevent automated attacks generally comes at the cost of slowing down the operation of web applications. Because perceptible latency in interactions with such applications is unacceptable to users, increasing efficiency in the fight against cyber-attacks is, and will continue to be, an important objective.

SUMMARY

According to various implementations, methods, apparatus, systems, and computer program products are provided for the detection of specific blocks of code within a larger body of source code. According to a particular class of implementations, source code is received from a server, responsive to a request from a client. A set of tokens based on the source code is generated. A first string of values representing a subset of the set of tokens is generated. It is determined whether any portion of the first string corresponds to any of a plurality of predetermined strings of values. The source code is processed responsive to determining whether any portion of the first string corresponds to any of the predetermined strings. The processed source code is provided to the client in response to the request.

In some implementations, each of the predetermined strings might correspond to a known library. In other implementations, each of the predetermined strings might correspond to previously processed code, and the processing of the source code might include use of processing results corresponding to the previously processed code.

According to some implementations, the source code might correspond to a web page and processing the source code might include recoding the source code to generate a polymorphic representation of the source code.

According to some implementations, where a first portion of the first string corresponds to one of the predetermined strings, a first portion of the source code corresponding to the first portion of the first string is excluded from at least a portion of the processing of the source code.

A further understanding of the nature and advantages of various implementations may be realized by reference to the remaining portions of the specification and the drawings.

DETAILED DESCRIPTION

This disclosure describes the automated, real-time detection of specific blocks of code within a larger body of source code. Specific implementations are described that involve the detection of known code libraries in web page code to improve the efficiency of the generation of polymorphic transformations of the web page code for the purpose of impeding automated cyber-attacks. However, it should be noted that these implementations are merely examples of a much broader class of applications contemplated by the inventors.

The polymorphic transformation of web page code involves dynamically altering the ordinarily static source code associated with a web page. This makes the source code more difficult to exploit from the perspective of an automated attacker while leaving web content viewable to the human user apparently unchanged. One challenge associated with such techniques is that, in order for a web page to remain functional, changes to its source code must be consistent across resources related to the web page. For instance, if a web page is associated with html source code further referencing JavaScript, any change made to the html code must be consistent with the internally referenced JavaScript and vice versa. Thus, changing the source code of a web page while maintaining its functionality requires identifying connections within and between components of the source code. Analyzing code for such connections can be computationally expensive, potentially introducing unacceptable latency in the delivery of web content and services to end users.

According to specific implementations described herein, blocks of code within source code that do not require processing are identified and excluded from processing, thereby reducing the latency associated with the processing of the source code. For example, detecting a known JavaScript library and excluding the library from unnecessary processing facilitates efficiency in the context of generating polymorphic transformations of web pages. In another example, gains in efficiency can be achieved by detecting code that has previously been analyzed for polymorphic transformation and excluding the analyzed code from potentially redundant processing and/or reusing the results of the previous processing.

Figure 1:
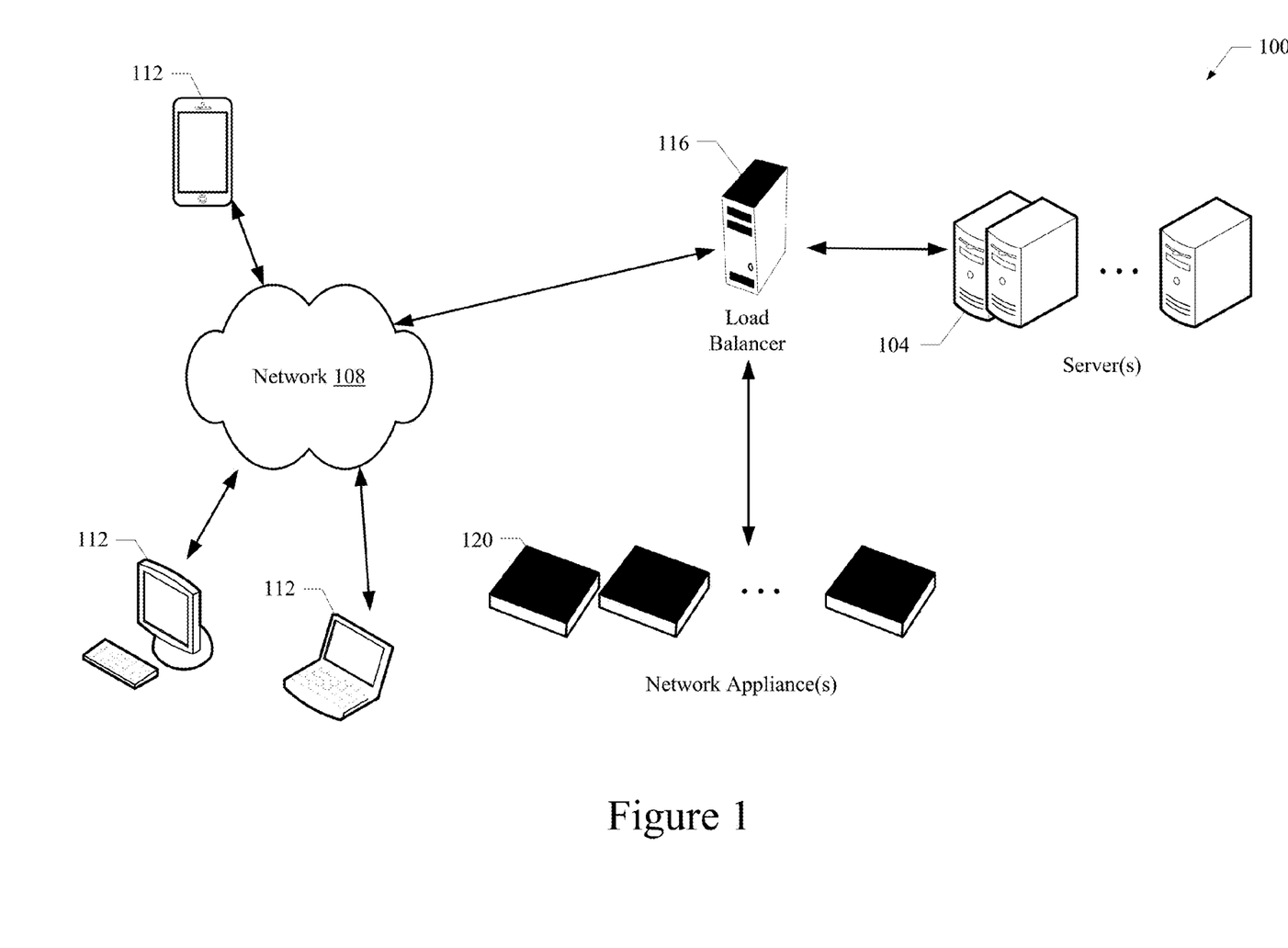
FIG. 1 shows an example of a system for generating polymorphic transformations of web page code for the purpose of impeding automated attacks.

FIG. 1 illustrates an example of a computing environment 100 in which polymorphic transformations of web page code are generated for the purpose of impeding automated attacks that are designed to exploit such code. One or more servers 104 serve web pages via a network 108 to one or more client devices 112. Network 108 represents any subset or combination of a wide array of network environments, including the internet, public networks, private networks, local area networks, TCP/IP-based networks, telecommunications networks, wireless networks, cable networks, etc. Client devices 112 could be any device capable of requesting web pages served by server(s) 104. For instance, such devices might include a desktop computer, a laptop computer, a tablet, a smartphone, a set top box, a wearable device, etc.

A load balancer 116 acts as an intermediary between the servers 104 and the network 108, distributing source code (e.g., web pages served by servers 104) to one or more network appliances 120. The one or more network appliances 120 process at least a portion of the source code received, generating polymorphic representations of the source code. Ultimately, the one or more network appliances 120 provide the transformed source code to one or more client devices 112 via the load balancer 116 to the network 108.

Figure 2:
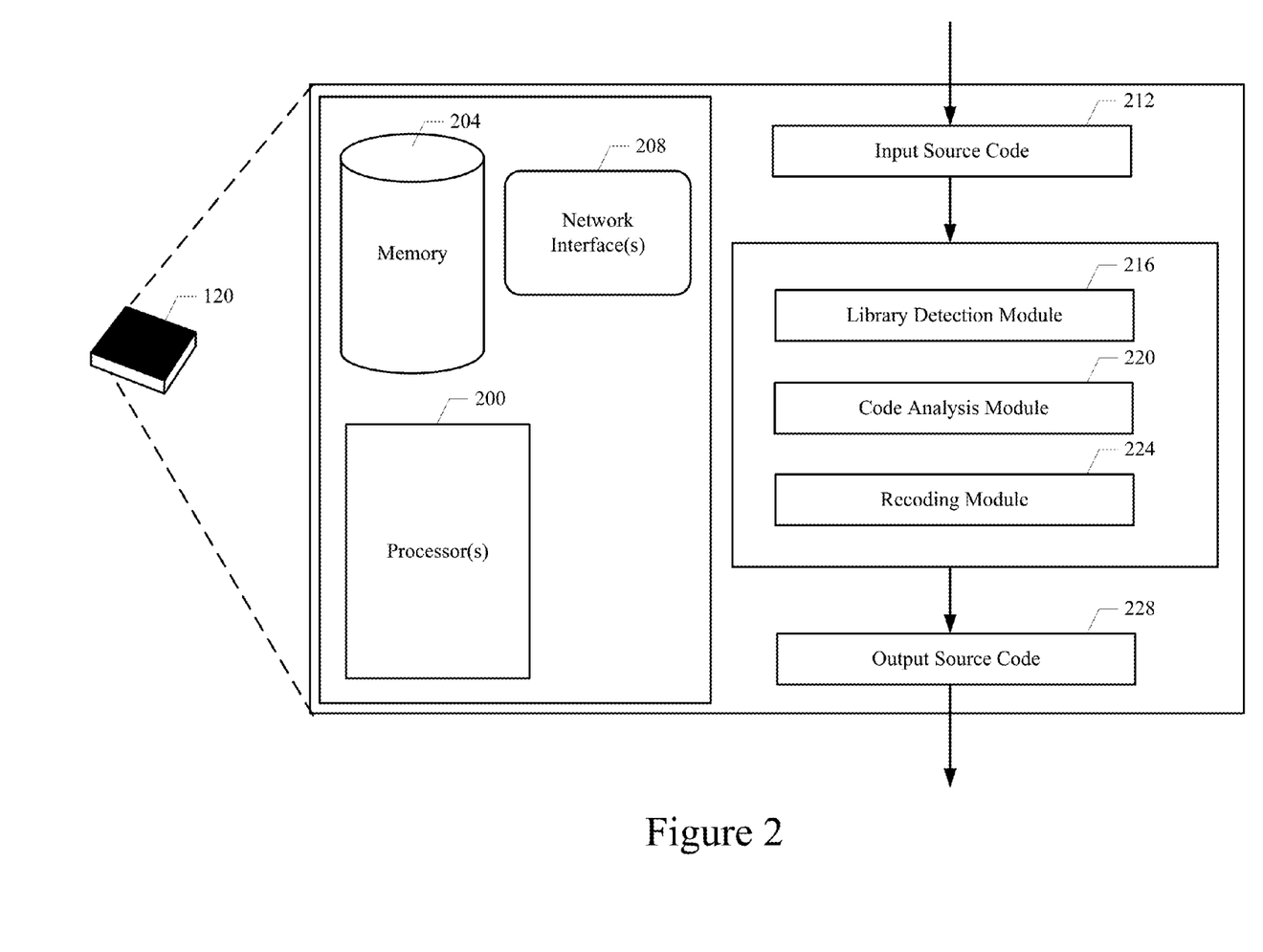
FIG. 2 is a simplified block diagram of a network appliance configured to generate polymorphic transformations of web page code.

A simplified block diagram of such a network appliance 120 is shown in FIG. 2. Appliance 120 contains one or more processors 200, including one or more single or multi-core processors configured to execute stored instructions. Appliance 120 also includes one or more memories 204. Memory 204 comprises non-transitory computer-readable storage media that could potentially include a wide variety of forms of volatile and non-volatile storage media. For instance, memory 204 could include electronic storage media, magnetic storage media, optical storage media, quantum storage media, mechanical storage media, etc. Memory 204 provides storage for computer readable instructions, data structures, program modules and other data for the operation of appliance 120.

Appliance 120 also includes one or more network interfaces 208. The network interfaces 208 may be used to connect via wired or wireless connections to cellular networks, including the internet, public networks, private networks, local area networks, etc. For example, network interfaces 208 may include modules for a T-carrier such as a T1 or T3 line, an optical carrier line such as a line to a synchronous optical network or a fiber optic network, an Ethernet connection, a digital subscriber line, a telephone line, a coaxial cable, etc. Network interfaces 208 might also include radio frequency modules for a 3G or 4G cellular network, a WiFi local area network and a Bluetooth private network. Appliance 120 also includes one or more buses or other internal communications hardware or software (not shown) that allow for the transfer of data and instructions between the various modules and components of the appliance.

While appliance 120 might have many functions, this document focuses mainly on the use of appliance 120 to generate polymorphic representations of source code associated with a web page. In one implementation, appliance 120 receives Input Source Code 212 associated with a web page through one or more network interfaces 208. The Input Source Code 212 is processed by a series of modules. While the number and variety of modules will vary depending on the specific implementation, three modules relevant to the depicted implementation are discussed herein. It will be understood that these and other modules may be implemented by processor(s) 200 executing code in memory 204.

In the library detection module 216, appliance 120 detects blocks of source code within the Input Source Code 212. For instance, appliance 120 might be configured to detect known JavaScript libraries. In other examples, appliance 120 might be configured to detect known libraries associated with other languages such as JavaScript, CoffeeScript, TypeScript, Dart, Cascading Style Sheets (CSS), Hypertext Markup Language (html), C, C++, Python, PHP: Hypertext Preprocessor, Perl, Visual Basic Script, etc. In yet another example, appliance 120 could be configured to detect blocks of source code that have already been subject to some level processing in order to exclude those blocks of code from redundant processing. Library detection is discussed in more detail below.

At least a portion of the Input Source Code 212 is subject to processing at the Code Analysis Module 220. As discussed above, one challenge associated with modification of web page source code is that changes must be consistent across all resources related to the web page. Thus, in the context of generating polymorphic transformations of web page code, the Code Analysis Module 220 processes the code to identify connections between web page resources—e.g., between html source code and internally referenced JavaScript. For additional information regarding the processing of web page code in the context of generating polymorphic transformations of the code, please refer to U.S. patent application Ser. No. 14/055,704 for "Safe Intelligent Content Modification" filed on Oct. 16, 2013 (Attorney Docket No. 37109-0005001), the entire disclosure of which is incorporated herein by reference for all purposes.

According to some implementations, certain blocks of source code identified at the Library Detection Module 216 might be excluded from processing by the Code Analysis Module 220 to save computational resources. For instance, third party JavaScript libraries, such as jQuery, TeaLeaf, some jQuery plugins, etc., might be detected by the Library Detection Module 216 and, as a result, be excluded from processing by the Code Analysis Module 220. Along the same lines, if a block of source code is identified at the Library Detection Module 216 to be a block of source code that has been previously analyzed, the previously analyzed block of source code might also be excluded from processing by the Code Analysis Module 220.

A polymorphic representation of the Input Source Code 212 is generated at the Recoding Module 224. It should be noted that there are a number of ways to transform web page source code without changing the web page's appearance to a user. For instance, a variable (e.g., "user_name") describing an inputted username could be changed from "user_name" to a random string (e.g., "n2qi87fpr3wr"). In another example, the layers of a field from which a username is gathered could be changed. Instead of taking all of the user name characters from a single field, the first and third characters might be entered in one field, the second character in another, etc. If the fields are overlaid in the user interface, a user cannot tell the difference between a representation of a website where all username characters are gathered from a single field and a representation where the characters are gathered from multiple overlaid fields. Ultimately, the recoding process can vary greatly from implementation to implementation. Further examples may be found with reference to U.S. application Ser. No. 14/055,704 incorporated herein by reference above.

After the source code is transformed in the Recoding Module 224, Output Source Code 228 comprising a polymorphic representation of the Input Source Code 212 is transmitted from the appliance 120 via the one or more network interfaces 208. In some implementations, the Output Source Code 228 is transmitted to a load balancer (e.g., load balancer 116 of FIG. 1) and then on to the requesting user device via a network (e.g., to one of devices 112 via network 108 as shown in FIG. 1). Alternatively, the Output Source Code 228 might be transmitted directly to the user device. The Output Source Code 228 may then be rendered as a web page in a browser on the user device.

It should be noted that, despite references to specific computing paradigms and software tools in this disclosure, the computer program instructions on which implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols in this disclosure are merely by way of example. Suitable alternatives known to those of skill in the art may be employed as appropriate for particular implementations.

Figure 3:
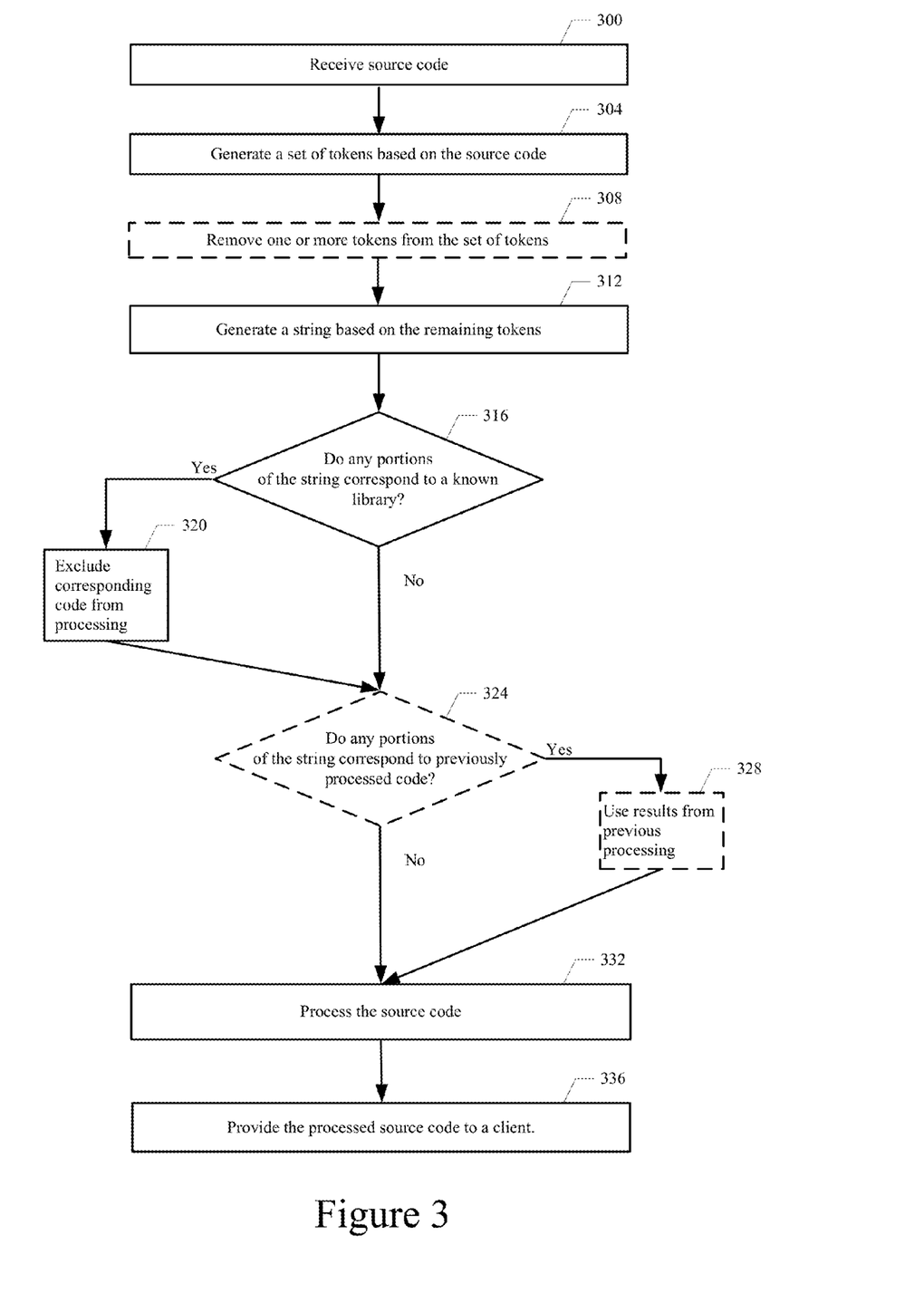
FIG. 3 is a flowchart illustrating the operation of a specific implementation in which library code is detected within the source code of a web page.

Referring now to FIG. 3, a particular example of the detection of blocks of code within a larger body of source code will be described. As mentioned above, the example of FIG. 3 is discussed in the context of detecting known code libraries within web page source code to improve the efficiency of generating polymorphic transformations of the web page source code for the purpose of impeding automated cyber-attacks. It should also be noted that the example of FIG. 3 could be implemented in a variety of ways including, for instance, integrated with the operation of a network appliance such as, for example, appliance 120 described above. Alternatively, code detection as described herein might be implemented in another device (e.g., integrated with the originating server or at an intermediate device such as a load balancer) or be distributed among multiple devices.

Source code is received from a server in response to a request from a client (300). The source code could include components in a wide variety of languages including, for example, JavaScript, CoffeeScript, TypeScript, Dart, Cascading Style Sheets (CSS), Hypertext Markup Language (html), C, C++, Python, PHP: Hypertext Preprocessor, Perl, Visual Basic Script, etc. The source code could also be associated with a number of objects including, for example, an executable program. For the sake of clarity and brevity, the specific implementations discussed in this document will focus on source code associated with a web page. However, it will be understood that the described techniques are not so limited.

A set of tokens is generated based on the source code (304). Tokenization is a broadly defined process. For instance, tokenization might include breaking up the source code into recognized words, whitespace, and punctuation, and including the whitespace and punctuation in the set of tokens. In another scenario, whitespace and punctuation may not be included. An example of tokenization is provided in FIG. 4. Source code 400 is broken into tokens 402-424. In this example, the tokens include all elements of the source code including whitespace and punctuation.

Any number of tokens, including zero, might be removed from the set of tokens to produce a subset of tokens (308). For example, in the context of web page code, some of the removed tokens might be associated with one or more portions of the source code that are unnecessary for processing of the source code by a browser. Tokens might also be removed such that the subset of tokens is sufficient, but no greater in size than necessary, to uniquely identify the various blocks of code within the source code. In other situations, a greater number of tokens may be removed such that various blocks within the source code may no longer be completely uniquely identifiable but are still sufficiently likely to be correctly identified based on the remaining subset of tokens.

Figure 4:
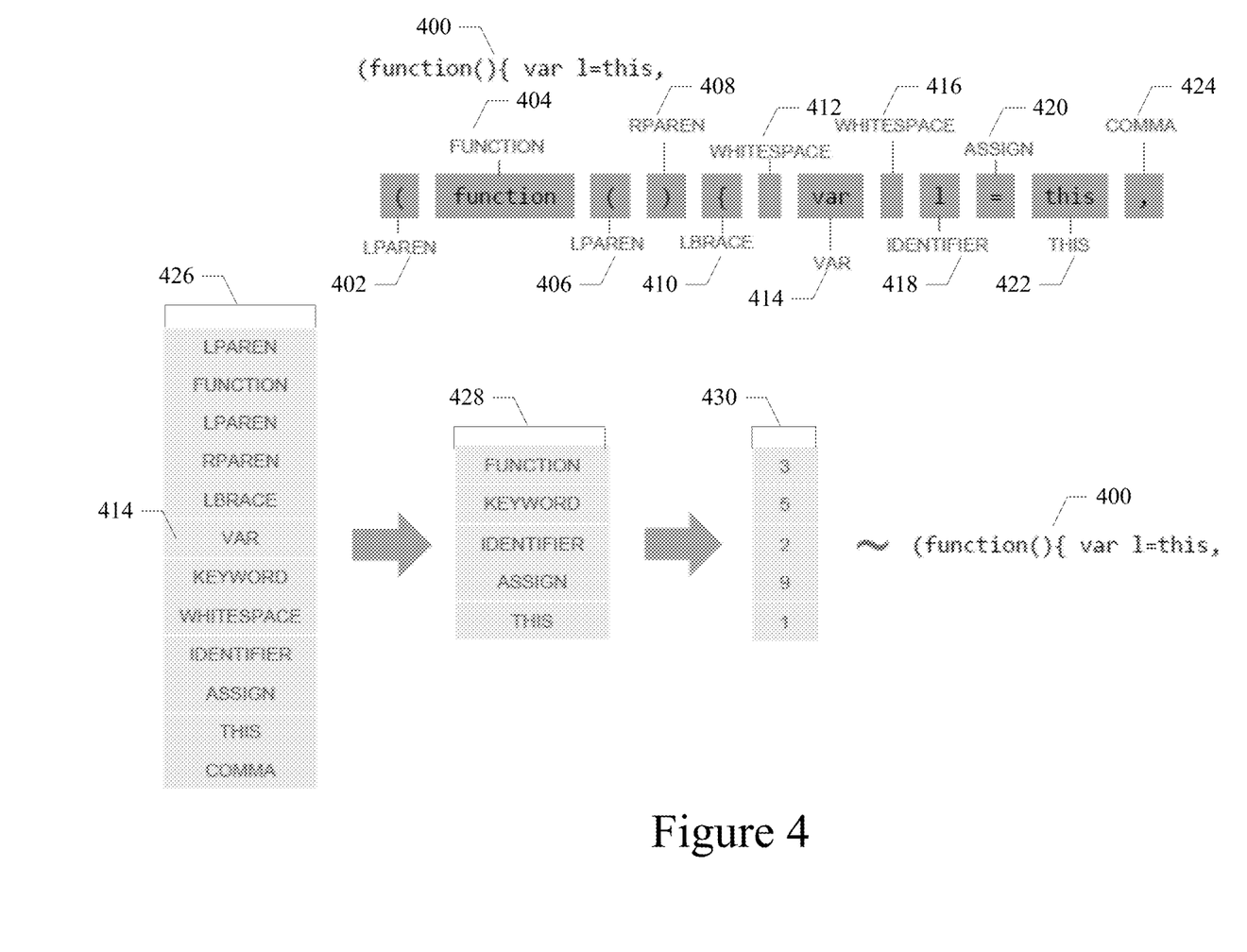
FIG. 4 shows an example of the tokenization of source code.

In the example shown in FIG. 4, tokens representing punctuation and whitespace are removed from a set of tokens 426 to produce subset 428. A token for "var" 414 is also removed. Since "var" is used to define variable scope, it may be used in some variations of a given library and not used in others. Therefore, while token subset 428 may not contain information about all of the intricacies of source code 400, it is likely sufficient to correctly identify whether or not source code 400 is a specific block of code, e.g., a known JavaScript library.

Referring again to FIG. 3, a string of values is generated based on the subset of tokens (312). This may be done in a variety of ways. For example, as shown in FIG. 4, the string could represent a one to one mapping of the tokens to integers; each token in subset 428 being mapped to an integer to generate string 430. In other implementations, the string could comprise alphanumeric characters or other symbols and could be associated with the subset of tokens in a variety of ways. For example, a specific class of tokens might be represented by a hexadecimal digit. Other ways of representing the subset of tokens may be application specific and will be appreciated by those of skill in the art.

Figure 5:
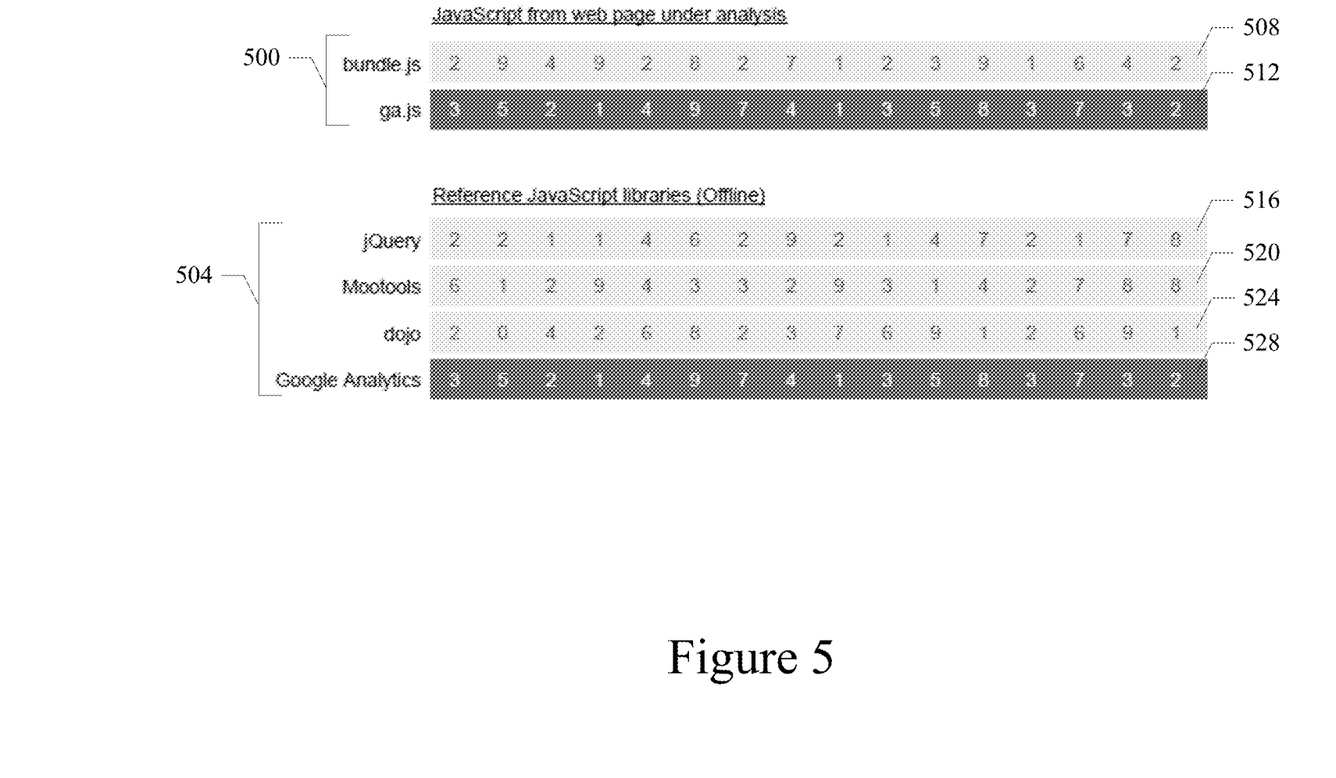
FIG. 5 shows an example of a comparison between strings corresponding to web page source code and strings corresponding to known JavaScript libraries.

It is then determined whether any portion of the string corresponds to any of a plurality of predetermined strings of values, each of which corresponds to a known library or block of code (316). FIG. 5 shows an example in which a set of strings 500 representing JavaScript from a web page are compared to a set of predetermined strings 504. In the depicted example, the strings derived from the web page include strings 508 and 512 corresponding to blocks of code labeled in FIG. 5 as bundle.js and ga.js, respectively. Predetermined strings 516, 520, 524, and 528 correspond to JavaScript libraries "jQuery," "Mootools," "dojo," and "Google Analytics," respectively. String 512 is determined to correspond to string 528 ("Google Analytics") because each element of string 512 matches the corresponding element of string 528. On the other hand, string 508 does not match any of the predetermined strings 504.

In a particular implementation, the predetermined strings are included in a previously generated database of strings in which at least some of the strings represent known JavaScript libraries. The database could be generated offline using a process similar to that described above with reference to 304-312. That is, each known library or block of code to be included in the database could be tokenized (304), have tokens optionally removed (308), and a have a representative string generated based on the remaining tokens (312). Such a database might, for example, be stored in the memory of or be otherwise available to appliance 120.

According to various implementations, determining whether any portion of a string generated from received source code corresponds to any of the predetermined strings (316) can be done in a variety of ways. According to a particular class of implementations, the identification process is implemented as a finite state machine, which is pre-computed offline. Pre-computing the state machine offline, allows it to be loaded into the memory of a device, e.g., appliance 120. Advantageously, the state machine operates quickly, allowing the string matching process to operate with little or no perceptible latency.

Figure 6:
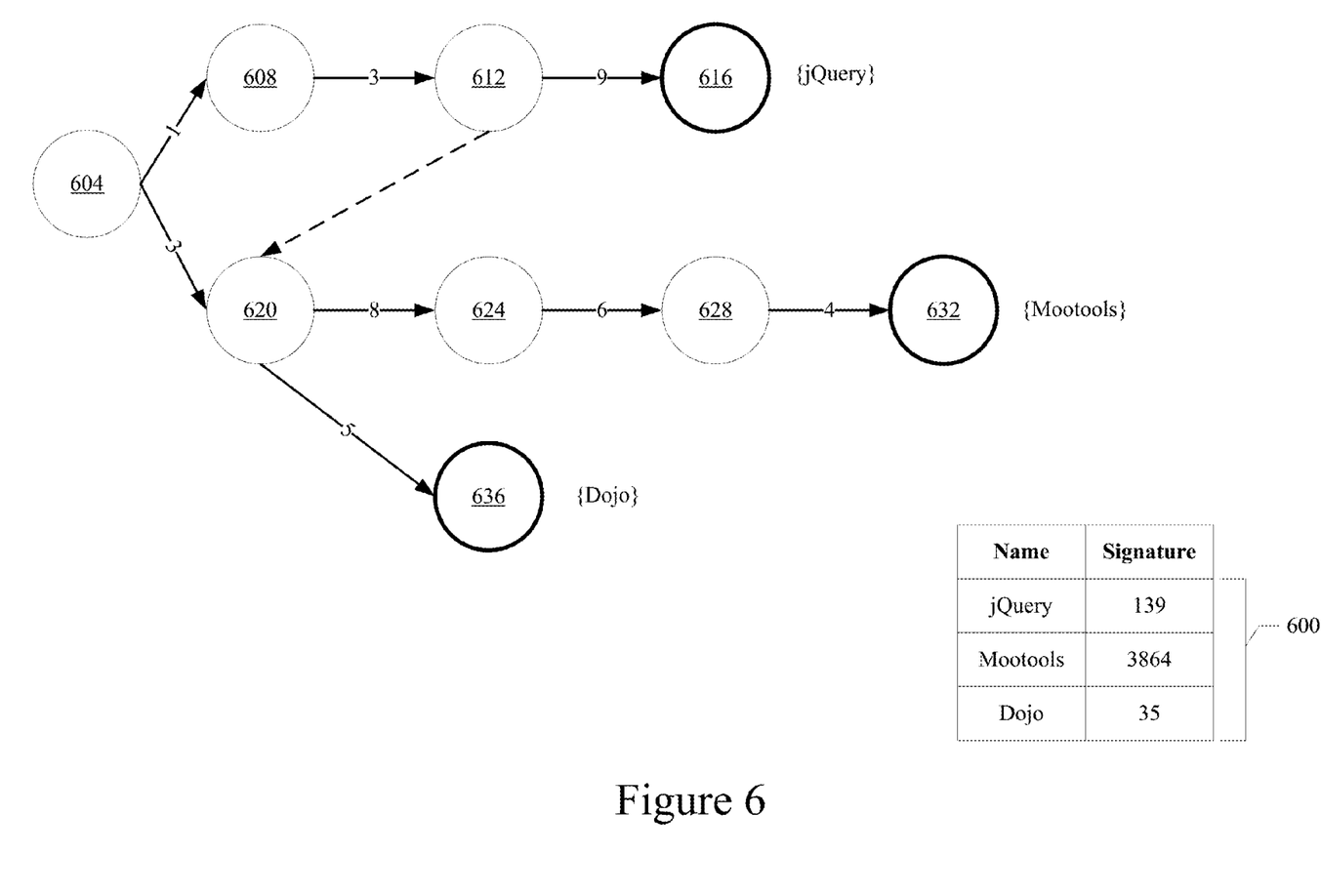
FIG. 6 shows an example of the Aho-Corasick string matching algorithm embodied as a finite state machine.

An example of the operation of such a state machine, employing the Aho-Corasick algorithm, is illustrated in FIG. 6. For more specific details about the Aho-Corasick algorithm, please refer to "Efficient string matching: an aid to bibliographic search" by Alfred V. Aho and Margaret J. Corasick, published in "Communications of the ACM" volume 18, issue 6 p. 333-40 (June 1975), the entire text of which is incorporated herein by reference for all purposes.

As depicted in FIG. 6, the states and transitions are defined by a set of predetermined strings 600, each representing a JavaScript library. More specifically, the transitions leading to an endpoint state (616, 632, or 636) are defined by successive characters in a string, each character corresponding to a given JavaScript library associated with the endpoint state. Each solid line with an arrow represents a transition and is labeled with a number which leads to the transition. A dotted line with an arrow represents a failure transition. For the sake of clarity, failure transitions leading to the root state 604 are not shown in FIG. 6. Each state in the machine is labeled with reference numerals 604-636. When an endpoint state (616, 632, or 636) is reached, the state machine outputs the name of the library corresponding to the endpoint state.

To illustrate how the state machine works, it may be helpful to walk through a specific example. Assume that a string representing received source code comprising integers 138647 is inputted into the machine. Beginning at root state 604, the first character of the input string, 1, will change the state to 608. The next character, 3, will change the state to 612. There is no transition from state 612 associated with the next character of the input string, 8, leading to a failure. There is a failure transition leading from 612 to 620 because 3 is a prefix leading to both state 612 and 620; therefore, the state will change to 620. The next characters, 8, 6, and 4, trigger transitions leading to states 624, 628, and 632 respectively. State 632 is an endpoint corresponding to the Mootools library; therefore, the machine will output that the 3864 portion of the string matches the Mootools library. There is no transition from state 632 corresponding to 7; thus, the next character, 7, leads to back to root state 604. Again, there is no transition associated with 7, so the state will not change. At this point, there are no remaining elements in the inputted string; thus, the process will stop.

Returning to FIG. 3, where a portion of the string is determined to correspond to one of the predetermined strings (316), a corresponding portion of the source code is excluded from at least a portion of the processing of the source code (320). As mentioned above, excluding identified blocks of code from processing may serve to save computational resources in the context of generating polymorphic transformations of web page code. For example, to save processing time, many third party JavaScript libraries may be excluded from the analysis stage of such a process.

According to some implementations, it may optionally be determined whether any portion of the string representing the received code corresponds to any of an additional set of predetermined strings, each of which corresponds to previously processed code (324). This allows for the re-use of the results of previous processing (328) after, for example, blocks of code have been processed and cached. For example, once a block of code has been processed, a string corresponding to that block of code can be saved as one of the predetermined strings. When a previously processed block of code is detected in newly received code, redundant processing steps can be avoided. For example, assume that a user accesses a web page that was accessed by another user. Also assume that at the time the first user accessed the web page, the source code associated with the web page was processed. Thus, when the second user accesses the same web page, a portion of the source code associated with the web page will have been previously processed. Because the portion of previously processed source code has already been subject to a level of processing, the results of the processing might be reused or redundant processing might be avoided altogether.

In some instances, data surrounding the processing of web page source code might be shared by multiple devices. For example, source code might be analyzed for connections by a first device (e.g., an appliance 120) when a web page is accessed by a first user. A string corresponding to the analyzed code could be shared with one or more additional devices (e.g., additional appliances 120). Thus, when future users access the previously analyzed web page, the analyzed code will be detected and redundant analysis skipped even if the first device is offline.

It should be noted that string processing for the detection of known libraries and the detection of previously processed code have been described as being performed separately for the purpose of clear illustration. However, it will be understood that these detections may be performed together as part of the same sequence of processing steps. That is, the predetermined strings corresponding to known libraries and those corresponding to previously processed code may be stored in the same database and be used to implement a single state machine against which received code is processed as described.

Returning to FIG. 3, the source code is processed responsive to the results of the string detection (332). For example, if no portions of the string representing the received code correspond to any of the predetermined strings, the entire source code might be processed. On the other hand, if a match is detected, the portion of the source code corresponding to the matched portion of the string might be subject to lesser processing or be excluded from processing.

It is important to note that the processing of the source code as represented in FIG. 3 is intended to cover a broad range of alternatives. For example, processing might include analysis for connections within and between components of source code. Processing might also include the recoding of source code to generate a polymorphic representation of the source code. Moreover, the manner in which the processing is responsive to the detection of blocks of code within the source code may also vary considerably. For example, if source code corresponding to a recently analyzed and recoded block of source code is detected, the analyzed and recoded block of source code might be re-used. In another example, a known JavaScript library might be detected, e.g., in the Library Detection Module 216 of appliance 120, and the responsive processing might include the detected code being excluded from processing by the Code Analysis Module 220.

Returning to FIG. 3, the processed source code is provided to a client (336). For instance, the source code might be associated with an online banking website and might be transmitted for rendering in a browser on a customer's smart phone. In the context of the polymorphic transformation of the web page code, the customer would be able to interact with the website with little or no perceptible latency because redundant processing is eliminated through the library detection techniques disclosed herein.

As mentioned above, the disclosed methods, apparatus, and computer-readable storage media for detecting specific blocks of code within a larger body of source code are not limited to the detection of known libraries. For example, they might be used purely for caching the results of previous processing as described above. For example, when a block of source code is analyzed, e.g., in the code analysis module 220 in appliance 120, a string representing the analyzed source code can be cached so as to prevent subsequent re-analysis of the same code. In another example, once source code has been through some level of processing (e.g., polymorphic transformation), the processed source code itself can be cached for later re-use. Alternatively, a result from the processing of a block of source code, e.g., whether or not the block of source code is transformable, can be cached and later re-used when that block of source code is identified.

Another useful implementation of detecting specific blocks of code within a larger body of source code might involve detecting malicious code that has been injected into web page source code. For example, a dynamically generated web page might receive an input containing a malicious script. A string representing the web page source code can be compared to a database of predetermined strings representing certain malicious scripts using the methods described herein. If a malicious script is detected, the malicious script can be removed before damage is done.

Yet another useful implementation of detecting specific blocks of code within a larger body of source code might involve source code scanning. For example, the detection methods disclosed herein could be used by developers to detect third party libraries in a source code repository.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    receiving, at a computing system, source code that is to be served to a client computer responsive to a request from the client computer;
    selecting a first portion of the source code to exclude from an analysis that the computing system is programmed to perform on the source code, the selecting including:
    generating a set of tokens based on the source code, and
    determining that a first subset of the set of tokens that corresponds to the first portion of the source code matches a predefined set of tokens that correspond to source code that is designated as source code that does not require analysis;
    analyzing, by the computing system, a second portion of the source code other than the first portion of the source code to determine a manner in which to recode the source code so as to interfere with an ability of malware to exploit the source code when the source code is executed on the client computer, the first portion of the source code excluded from the analyzing as a result of the determining that the first subset of the set of tokens matches the predefined set of tokens;
    recoding the source code using a result of the analyzing; and
    providing the recoded source code to the client computer in response to the request.

2. The method of claim 1, further comprising discarding one or more tokens from the set of tokens to generate the first subset of the set of tokens, wherein at least some of the discarded tokens correspond to one or more portions of the source code that are identified as being unnecessary for the source code to be processed by a browser application at the client computer.

3. The method of claim 1, wherein:
    the source code comprises at least one of hypertext markup language (HTML) code, JavaScript code, and Cascading Style Sheet (CSS) code for a web page;
    the client computer is a first client computer;
    the request is a first request from the first client computer;
    recoding the source code using the result of the analyzing comprises recoding a first instance of the source code using the result of the analyzing;
    providing the recoded source code to the client computer in response to the request comprises providing the recoded first instance of the source code to the first client computer in response to the first request; and
    the method further comprises:
    recoding a second instance of the source code using the result of the analyzing of the second portion of the first instance of the source code, and
    providing the recoded second instance of the source code to a second client computer in response to a second request, the second client computer being different than the first client computer, the second instance of the source code being recoded differently than the first instance of the source code.

4. The method of claim 1, wherein the source code contains elements in one or more of the following languages: JavaScript, CoffeeScript, TypeScript, Dart, Cascading Style Sheets (CSS), Hypertext Markup Language (html), and Visual Basic Script.

5. The method of claim 1, wherein:
    selecting the first portion of the source code to exclude from the analysis that the computing system is programmed to perform on the source code further comprises mapping at least the first subset of the set of tokens to a series of numeric values that represent the at least the first subset of the set of tokens; and
    determining that the first subset of the set of tokens that corresponds to the first portion of the source code matches the predefined set of tokens comprises comparing at least a portion of the series of numeric values that represent the at least the first subset of the set of tokens to a predefined series of numeric values that represent the source code that is designated as source code that does not require analysis.

6. The method of claim 5, wherein comparing the at least the portion of the series of numeric values that represent the at least the first subset of the set of tokens, to the predefined series of numeric values that represent the source code that is designated as source code that does not require analysis, comprises performing an Aho-Corasick matching algorithm.

7. The method of claim 5, wherein the series of numeric values that represent the at least the first subset of the set of tokens comprises a series of integer values, wherein each unique integer value in the series of integer values maps to a different type of token in the at least the first subset of the set of tokens.

8. The method of claim 1, wherein recoding the source code comprises obfuscating the source code according to one or more constraints determined based on the result of the analyzing of the second portion of the source code and further based on a result of an earlier analysis of source code that corresponds to the first portion of the source code, the earlier analysis not performed in connection with the request from the client computer.

9. The method of claim 1, wherein selecting the first portion of the source code to exclude from the analysis comprises selecting a portion of the source code that is determined to correspond to source code from a predefined source code library.

10. The method of claim 1, wherein analyzing the second portion of the source code to determine a manner in which to recode the source code so as to interfere with the ability of malware to exploit the source code when the source code is executed on the client computer comprises identifying connections among components of the source code that are necessary to be maintained in the recoded source code in order to ensure functionality of the recoded source code.

11. One or more non-transitory computer-readable storage devices having instructions stored thereon that, when executed by one or more processors, cause performance of operations comprising:

receiving, at a computing system, source code that is to be served to a client computer responsive to a request from the client computer;

selecting a first portion of the source code to exclude from an analysis that the computing system is programmed to perform on the source code, the selecting including:
generating a set of tokens based on the source code, and
determining that a first subset of the set of tokens that corresponds to the first portion of the source code matches a predefined set of tokens that correspond to source code that is designated as source code that does not require analysis;

analyzing, by the computing system, a second portion of the source code other than the first portion of the source code to determine a manner in which to recode the source code so as to interfere with an ability of malware to exploit the source code when the source code is executed on the client computer, the first portion of the source code excluded from the analyzing as a result of the determining that the first subset of the set of tokens matches the predefined set of tokens;

recoding the source code using a result of the analyzing; and providing the recoded source code to the client computer in response to the request.

12. The one or more non-transitory computer-readable storage devices of claim 11, wherein the operations further comprise discarding one or more tokens from the set of tokens to generate the first subset of the set of tokens, wherein at least some of the discarded tokens correspond to one or more portions of the source code that are identified as being unnecessary for the source code to be processed by a browser application at the client computer.

13. The one or more non-transitory computer-readable storage devices of claim 11, wherein:
the source code comprises at least one of hypertext markup language (HTML) code, JavaScript code, and Cascading Style Sheet (CSS) code for a web page;
the client computer is a first client computer;
the request is a first request from the first client computer;
recoding the source code using the result of the analyzing comprises recoding a first instance of the source code using the result of the analyzing;
providing the recoded source code to the client computer in response to the request comprises providing the recoded first instance of the source code to the first client computer in response to the first request; and
the operations further comprise:
recoding a second instance of the source code using the result of the analyzing of the second portion of the first instance of the source code, and
providing the recoded second instance of the source code to a second client computer in response to a second request, the second client computer being different than the first client computer, the second instance of the source code being recoded differently than the first instance of the source code.

14. The one or more non-transitory computer-readable storage devices of claim 11, wherein the source code contains elements in one or more of the following languages: JavaScript, CoffeeScript, TypeScript, Dart, Cascading Style Sheets (CSS), Hypertext Markup Language (html), and Visual Basic Script.

15. The one or more non-transitory computer-readable storage devices of claim 11, wherein:
selecting the first portion of the source code to exclude from the analysis that the computing system is programmed to perform on the source code further comprises mapping at least the first subset of the set of tokens to a series of numeric values that represent the at least the first subset of the set of tokens; and
determining that the first subset of the set of tokens that corresponds to the first portion of the source code matches the predefined set of tokens comprises comparing at least a portion of the series of numeric values that represent the at least the first subset of the set of tokens to a predefined series of numeric values that represent the source code that is designated as source code that does not require analysis.

16. The one or more non-transitory computer-readable storage devices of claim 15, wherein comparing the at least the portion of the series of numeric values that represent the at least the first subset of the set of tokens to the predefined series of numeric values that represent the source code that is designated as source code that does not require analysis comprises the performing an Aho-Corasick matching algorithm.

17. The one or more non-transitory computer-readable storage devices of claim 15, wherein the series of numeric values that represent the at least the first subset of the set of tokens comprises a series of integer values, wherein each unique integer value in the series of integer values maps to a different type of token in the at least the first subset of the set of tokens.

18. The one or more non-transitory computer-readable storage devices of claim 11, wherein recoding the source code comprises obfuscating the source code according to one or more constraints determined based on the result of the analyzing of the second portion of the source code and further based on a result of an earlier analysis of source code that corresponds to the first portion of the source code, the earlier analysis not performed in connection with the request from the client computer.

19. The one or more non-transitory computer-readable storage devices of claim 11, wherein selecting the first portion of the source code to exclude from the analysis comprises selecting a portion of the source code that is determined to correspond to source code from a predefined source code library.

20. The one or more non-transitory computer-readable storage devices of claim 11, wherein analyzing the second portion of the source code to determine a manner in which to recode the source code so as to interfere with the ability of malware to exploit the source code when the source code is executed on the client computer comprises identifying connections among components of the source code that are necessary to be maintained in the recoded source code in order to ensure functionality of the recoded source code.

21. A computing system comprising:
one or more processors; and
one or more computer-readable storage devices having instructions stored thereon that, when executed by the one or more processors, cause performance of operations comprising:
receiving, at the computing system, source code that is to be served to a client computer responsive to a request from the client computer;
selecting a first portion of the source code to exclude from an analysis that the computing system is programmed to perform on the source code, the selecting including:
generating a set of tokens based on the source code, and
determining that a first subset of the set of tokens that corresponds to the first portion of the source code matches a predefined set of tokens that correspond to source code that is designated as source code that does not require analysis;

analyzing, by the computing system, a second portion of the source code other than the first portion of the source code to determine a manner in which to recode the source code so as to interfere with an ability of malware to exploit the source code when the source code is executed on the client computer, the first portion of the source code excluded from the analyzing as a result of the determining that the first subset of the set of tokens matches the predefined set of tokens;

recoding the source code using a result of the analyzing; and providing the recoded source code to the client computer in response to the request.

\* \* \* \* \*